United States Patent
Lutzke et al.

(10) Patent No.: US 8,944,473 B2
(45) Date of Patent: Feb. 3, 2015

(54) QUICK CONNECTOR WITH A SENSOR HOUSING

(75) Inventors: Matthew D. Lutzke, Clarkston, MI (US); Justin L. Gauthier, Shelby Township, MI (US)

(73) Assignee: A. Raymond et Cie, Grenoble (FR)

( * ) Notice: Subject to any disclaimer, the term of this patent is extended or adjusted under 35 U.S.C. 154(b) by 86 days.

(21) Appl. No.: 13/703,820

(22) PCT Filed: Aug. 30, 2011

(86) PCT No.: PCT/US2011/049657
§ 371 (c)(1),
(2), (4) Date: Jan. 11, 2013

(87) PCT Pub. No.: WO2012/030775
PCT Pub. Date: Mar. 8, 2012

(65) Prior Publication Data
US 2013/0147184 A1    Jun. 13, 2013

Related U.S. Application Data

(60) Provisional application No. 61/378,664, filed on Aug. 31, 2010, provisional application No. 61/385,721, filed on Sep. 23, 2010.

(51) Int. Cl.
*F16L 37/00* (2006.01)
*F16L 37/12* (2006.01)
(Continued)

(52) U.S. Cl.
CPC ............... *F16L 37/12* (2013.01); *F16L 37/098* (2013.01); *F16L 37/144* (2013.01); *F16L 47/32* (2013.01); *F16L 41/008* (2013.01)
USPC .......................................... 285/305; 285/319

(58) Field of Classification Search
USPC .................................................. 285/319, 305
See application file for complete search history.

(56) References Cited

U.S. PATENT DOCUMENTS

| 2,344,647 | A | 3/1944 | Simmons, Jr. |
| 5,034,848 | A | 7/1991 | Rowlette et al. |

(Continued)

FOREIGN PATENT DOCUMENTS

| DE | 102010006766 A1 | 8/2011 |
| FR | 2711393 A1 | 4/1995 |
| WO | 2007106749 A2 | 9/2007 |

OTHER PUBLICATIONS

Parsons, Mark; Automotive Pressure Sensors; Sensors Magazine; Dec. 7, 2009; 13 pages; http://archives.sensorsmag.com/articles/0401/32/main.shtml.

*Primary Examiner* — David E Bochna
(74) *Attorney, Agent, or Firm* — Dickinson Wright PLLC (57) ABSTRACT

A quick connector assembly (20) includes a coupling housing (22) having a fluid quick connector (34) disposed about an end (24) and a sensor quick connector (40) axially aligned with an auxiliary axis ($A_2$). A sensor housing (42) is insertable along the auxiliary axis ($A_2$) to couple a sensor with the coupling housing (22). The sensor quick connector (40) includes at least one leg (48) and the sensor housing (42) includes a locking barb (44) extending radially outwardly to flex the leg (48) during axial movement of the sensor housing (42). The leg (48) includes a mechanical stop (54) and the locking barb (44) includes a shoulder (70) for engaging the mechanical stop (54) to establish an interlocked position of the housings (22, 42) and prevent rotational movement of the sensor housing (42) about the auxiliary axis ($A_2$).

12 Claims, 5 Drawing Sheets

(51) Int. Cl.
*F16L 37/098* (2006.01)
*F16L 37/14* (2006.01)
*F16L 47/32* (2006.01)
*F16L 41/00* (2006.01)

(56) References Cited

U.S. PATENT DOCUMENTS

| | | | |
|---|---|---|---|
| 5,079,953 | A | 1/1992 | Martin et al. |
| 5,215,339 | A | 6/1993 | Morse et al. |
| 5,315,878 | A | 5/1994 | Birenheide |
| 5,423,577 | A | 6/1995 | Ketcham |
| 5,586,792 | A | 12/1996 | Kalahasthy et al. |
| 5,614,091 | A | 3/1997 | Janik et al. |
| 5,628,531 | A | 5/1997 | Rosenberg et al. |
| 5,733,044 | A | 3/1998 | Rose et al. |
| 5,897,145 | A | 4/1999 | Kondo et al. |
| 6,000,290 | A | 12/1999 | Benton et al. |
| 6,142,537 | A | 11/2000 | Shimada et al. |
| 6,254,144 | B1 | 7/2001 | Hagan |
| 6,318,764 | B1 | 11/2001 | Trede et al. |
| 6,334,634 | B1 | 1/2002 | Osterkil |
| 6,575,038 | B1 | 6/2003 | Takakuwa et al. |
| 6,595,556 | B1 | 7/2003 | Zenko et al. |
| 6,708,716 | B2 | 3/2004 | Schultz et al. |
| 6,781,814 | B1 | 8/2004 | Greene |
| 6,827,374 | B2 | 12/2004 | Gendrin et al. |
| 6,921,275 | B2 | 7/2005 | Rehmann et al. |
| 7,197,937 | B2 | 4/2007 | Amore et al. |
| 7,237,948 | B2 | 7/2007 | Nakabayashi |
| 7,325,463 | B2 | 2/2008 | Morrison et al. |
| 7,445,249 | B2 | 11/2008 | Feger et al. |
| 7,503,784 | B2 | 3/2009 | Osborne et al. |
| 7,549,677 | B2 | 6/2009 | Feger et al. |
| 7,775,562 | B2 | 8/2010 | Sawada |
| 2003/0025325 | A1 | 2/2003 | Rehmann et al. |
| 2006/0273276 | A1 | 12/2006 | Moretti et al. |
| 2007/0062306 | A1 | 3/2007 | Morrison et al. |
| 2007/0209716 | A1 | 9/2007 | Rankin |
| 2007/0212912 | A1 | 9/2007 | Osborne et al. |
| 2009/0145212 | A1 | 6/2009 | Powell |

QUICK CONNECTOR WITH A SENSOR HOUSING

CROSS REFERENCE TO RELATED APPLICATIONS

This U.S. National Stage patent application claims the benefit of International Application Serial No. PCT/US11/049657 filed Aug. 30, 2011, entitled "Quick Connector With A Sensor Housing, which claims the benefit of U.S. Provisional Application Ser. No. 61/378,664 filed Aug. 31, 2010, entitled "Quick Connector With Integrated Pressure Sensor" and U.S. Provisional Application Ser. No. 61/385,721 filed Sep. 23, 2010, entitled "Quick Connector With A Sensor Housing," the entire disclosures of all applications being considered part of the disclosure of this application, and hereby incorporated by reference.

BACKGROUND OF THE INVENTION

1. Field of the Invention

A quick connector assembly capable of easy assembly and installation wherein the quick connector assembly allows fluid communication between a first fluid line and a second fluid line and a sensor is coupled thereto using a sensor quick connector.

2. Description of the Prior Art

The quick connector assemblies to which the subject invention pertains are assemblies which allow a sensor to monitor a characteristic or property of a fluid passing through the quick connector assembly. One such quick connector assembly is disclosed in U.S. Pat. No. 7,503,784 granted to Osborne wherein a connector assembly includes a coupling housing extending along a coupling axis between an inlet end and an outlet end with a fluid quick connector disposed about one of the ends for securing a fluid line to the coupling housing. The coupling housing defines a coupling passageway extending along the coupling axis between the ends and an auxiliary passageway in fluid communication with the coupling passageway and extending along an auxiliary axis which intersects the coupling axis.

Although the prior art assemblies are able to monitor a property or characteristic of fluid passing through the quick connector assembly, such assemblies require the permanent incorporation of sensing elements into the housing, thus increasing manufacturing and assembly costs. In addition, the prior art assemblies lack flexibility to allow a variety of sensors to be coupled with the quick connector assembly. Accordingly, there remains a need for a quick connector assembly which provides for a variety of sensors to be easily and quickly coupled with a quick connector assembly.

SUMMARY OF THE INVENTION

The invention provides for a connector assembly including a sensor quick connector axially aligned with the auxiliary axis and a sensor housing insertable along the auxiliary axis and including at least one locking barb to establish interlocking relationship with the sensor quick connector. One of the main advantages of the invention is the ease of coupling the sensor housing with the sensor quick connector to quickly allow a sensor to be coupled with the coupling housing. As a result, the quick connection between the sensor housing and the sensor quick connector ultimately reduces assembly cost and time.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE ENABLING EMBODIMENTS

Figure 1:
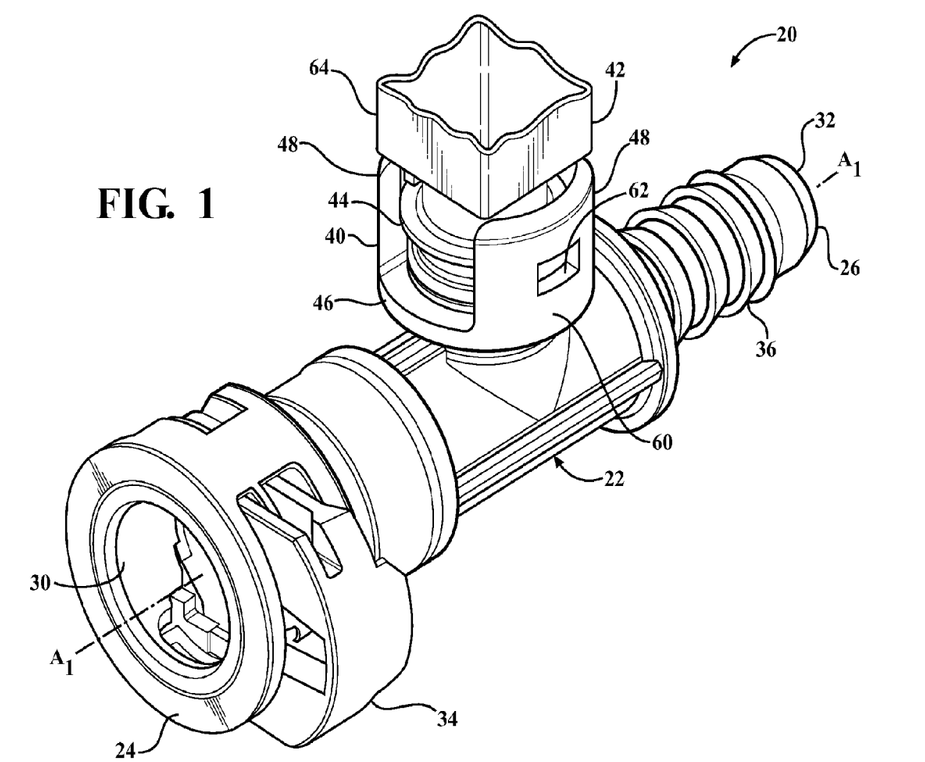
FIG. 1 is a perspective view of a quick connector assembly.

Referring to the Figures, wherein like numerals indicate corresponding parts throughout the several views, a quick connector assembly 20 for establishing fluid communication between a first fluid line (not shown) and a second fluid line (not shown) and a sensor (not shown) is generally illustrated in FIG. 1. While the connector assembly 20 is illustrated as being generally tubular and having a t-shaped configuration, the connector assembly 20 could be formed in a variety of sizes, shapes or configurations, such as oblong, square, l-shaped, u-shaped and the like. The connector assembly 20 includes a coupling housing 22 extending along a coupling axis $A_1$ between an inlet end 24 and an outlet end 26. The coupling housing 22 defines a coupling passageway 28 extending along the coupling axis $A_1$ between the ends 24, 26. The coupling passageway 28 has a first orifice 30 disposed adjacent the inlet end 24 for receiving the first fluid line to dispose the first fluid line in the coupling passageway 28 and a second orifice 32 disposed adjacent the outlet end 26 for establishing communication with the second fluid line to move a fluid through the connector assembly 20. Although the ends 24, 26 are illustrated as male and female type connections, the connector assembly 20 could be formed using any type of connection means for coupling a fluid line to the ends 24, 26.

As best shown in FIG. 1, the first end 24 of the housing includes a fluid quick connector 34 being generally U-shaped and movable between an extended position and a pushed-in position for securing the inlet line in the received position. The preferred embodiment of the fluid quick connector 34 is the P2L® Quick Connector design as disclosed in U.S. Pat. No. 7,445,249 assigned to A. Raymond & CIE. However, any variation of a fluid quick connector can be substituted for the preferred embodiment without departing from the scope of the invention. The outlet end 26 of the coupling housing 22 includes a barbed stem 36 for retaining the second line about the second orifice 32.

Figure 6:
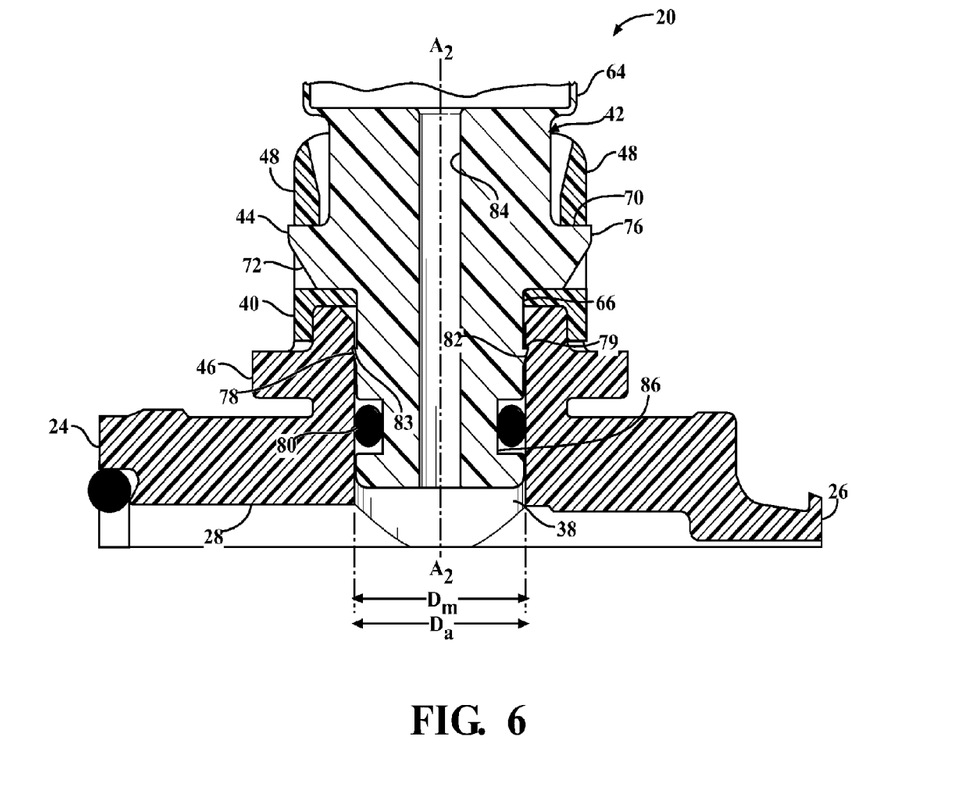
FIG. 6 is a cross-sectional view of the sensor housing and the sensor quick connector in the interlocked position.

As best shown in FIG. 6, the coupling housing 22 defines an auxiliary passageway 38 disposed between the first end 24 and the second end 26 which extends along an auxiliary axis $A_2$ that intersects the coupling axis $A_1$ and has an auxiliary passageway diameter $D_a$ for establishing fluid communication with the coupling passageway 28. The coupling housing 22 includes a sensor quick connector 40 axially aligned with the auxiliary axis $A_2$. In the preferred embodiment, the auxiliary axis $A_2$ is disposed transverse or perpendicular to the coupling axis $A_1$. As best shown in FIG. 1, the connector assembly 20 also includes a sensor housing 42 for coupling a sensor (not shown) with the coupling housing 22 to allow the sensor to monitor a property or characteristic of fluid in the passageways 28, 38, such as for example fluid pressure, temperature or flow.

Figure 3:
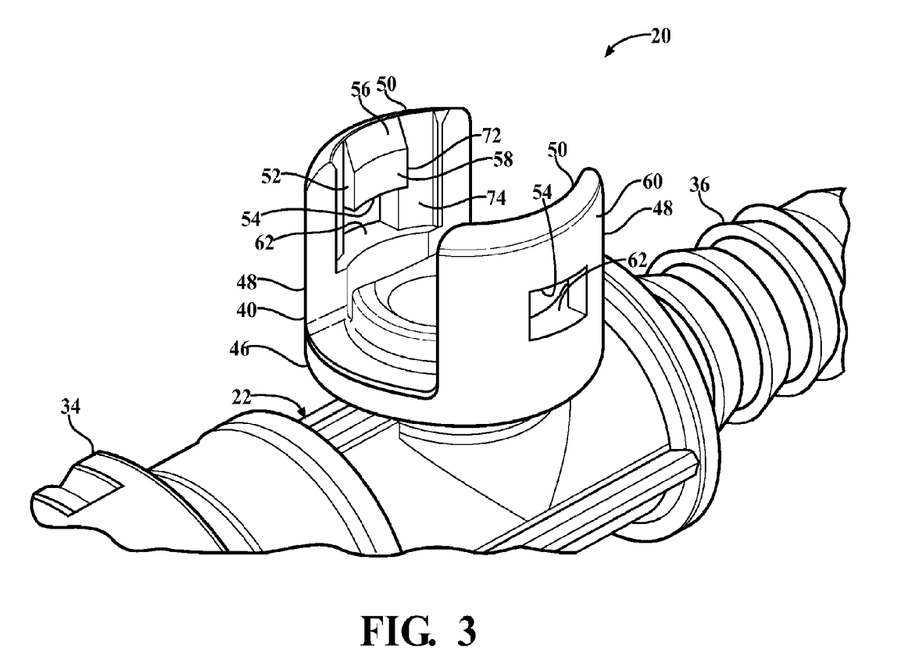
FIG. 3 is a magnified view of a sensor quick connector of the connector assembly.

As best shown in FIG. 3, the coupling housing 22 includes a collar 46 axially aligned with the auxiliary axis $A_2$ and disposed in surrounding and circumferential relationship with the auxiliary passageway 38 to further define the auxiliary passageway 38. The sensor quick connector 40 includes at least one leg 48 extending outwardly from the collar 46 to a receiving end 50. In the preferred embodiment, the sensor quick connector 40 includes a plurality of legs 48 disposed in spaced relationship to one another. Each leg 48 includes a locking tab 52 having a first mechanical stop 54 that is disposed adjacent the receiving end 50. The locking tab 52 is tapered towards the receiving end 50 to define a first tapered surface 56 of the leg 48 and also includes a first transition surface 58 extending downwardly from the first tapered surface 56 and terminating at the first mechanical stop 54. In the preferred embodiment, each of the legs 48 are semi-cylindrical to define an outer surface 60 being convex relative to the auxiliary axis $A_2$ and disposed opposite the first transition surface 58, and a window 62 extends through each of the legs 48 between the surfaces 58, 60 to define the first mechanical stop 54. In addition, since the legs 48 are semi-cylindrical, in the preferred embodiment the first transition surface 58 is also concave in shape relative to the auxiliary axis $A_2$.

Figure 2:
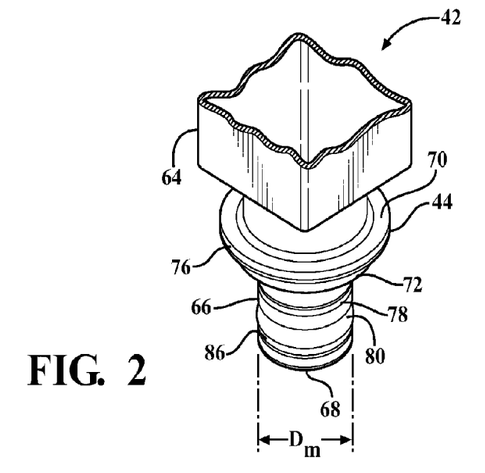
FIG. 2 is a perspective view of a sensor housing of the quick connector assembly.
Figure 4:
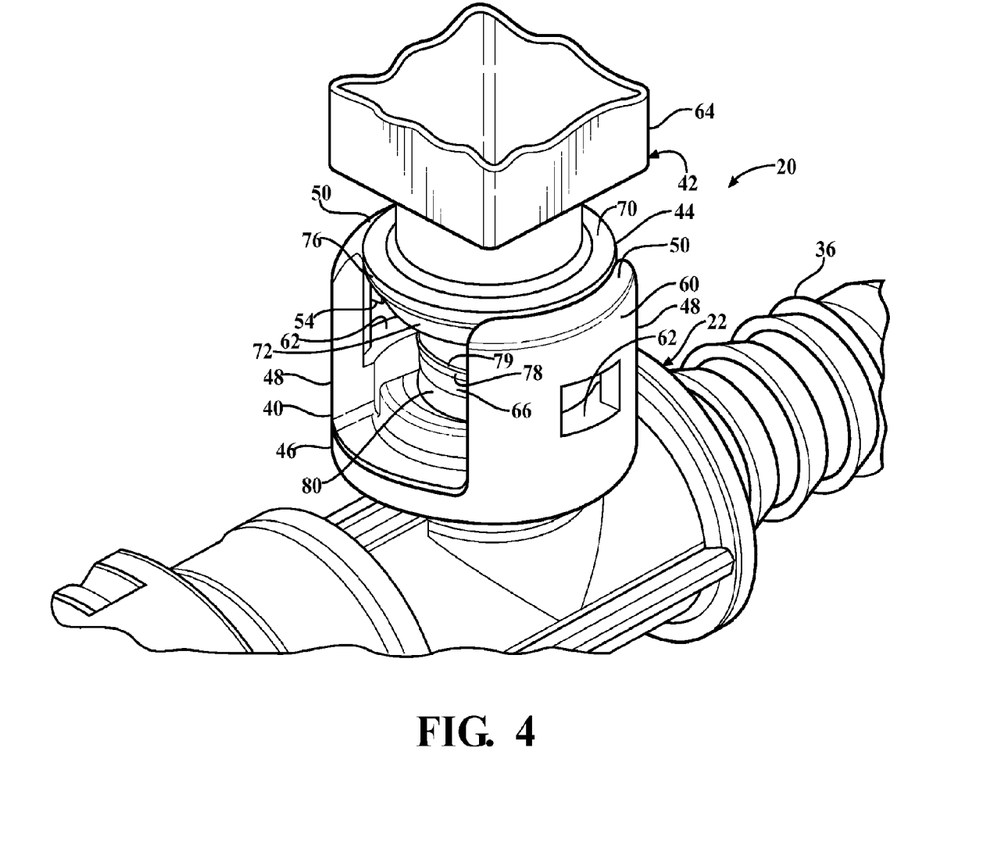
FIG. 4 is a magnified view of the sensor housing and the sensor quick connector illustrating the sensor housing being partially inserted and in an unlocked position.
Figure 5:
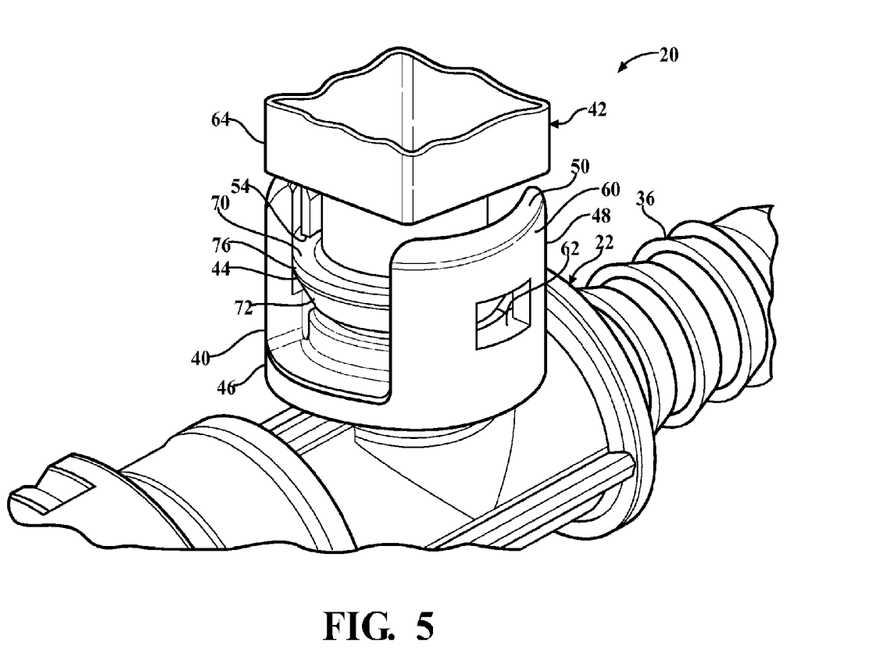
FIG. 5 is a magnified view of the sensor housing and the sensor quick connector illustrating an interlocked position of the connector assembly.

As best shown in FIG. 2, the sensor housing 42 includes a receiving portion 64 being sized complementary to the sensor (not shown) and a male portion 66 extends from the receiving portion 64 to a distal end 68. In other words, the receiving portion 64 is sized based on the particular sensor which is desired to be coupled to the sensor housing 42. The sensor housing 42 includes a locking barb 44, and as best shown in FIGS. 4 and 5, the sensor housing 42 is insertable along the auxiliary axis $A_2$ to establish interlocking relationship with the sensor quick connector 40. For example, FIG. 4 illustrates the sensor housing 42 disposed in an unlocked position relative to the sensor quick connector 40 and FIG. 5 illustrates the sensor housing 42 disposed in an interlocked position relative to the sensor quick connector 40. As will be described in greater detail, one of the main advantages of the connector assembly 20 is the ease of combining the sensor housing 42 with the sensor quick connector 40 to quickly couple the sensor with the coupling housing 22.

As best shown in FIG. 2, the locking barb 44 extends radially outwardly from the male portion 66 and is disposed circumferentially about the male portion 66 to define a first shoulder 70 for engaging the first mechanical stop 54 of the sensor quick connector 40 in the interlocked position. As best shown in FIG. 5, the first mechanical stop 54 and the first shoulder 70 interact to prevent axial movement of the sensor housing 42 and provide a snap fit design which is considered non-serviceable once the sensor housing 42 and the sensor quick connector 40 are interlocked. In addition, the use of this snap fit design between the sensor housing 42 and the sensor quick connector 40 ultimately reduces assembly cost and time.

As previously mentioned, the sensor housing 42 is insertable along the auxiliary axis $A_2$ to establish interlocking relationship with the sensor quick connector 40. In order to facilitate this movement, as best shown in FIG. 4, the locking barb 44 includes a second tapered surface 72 sized complementary to the first tapered surface 56 of the legs 48 and which is tapered from the first shoulder 70 towards the male portion 66. In other words, complementary is used to describe the tapered surfaces 56, 72 disposed in parallel relationship to one another such that the surfaces are tapered at the same relative angles. Accordingly, during operation when the sensor housing 42 is initially inserted into the sensor quick connector 40 along the auxiliary axis $A_2$, and in an unlocked position as shown in FIG. 4, the second tapered surface 72 of the locking barb 44 engages the first tapered surfaces 56 of the locking tabs 52 to flex the legs 48 radially outwardly and allow the distal end 68 of the male portion 66 to advance into the auxiliary passageway 38. In other words, the tapered surfaces 56, 72 of both the legs 48 and the locking barb 44 are disposed in sliding engagement during axial movement of the sensor housing 42 between the unlocked and interlocked positions such that the relative movement of the tapered surfaces 56, 72 flexes the legs 48 radially outwardly about the auxiliary axis $A_2$. As best shown in FIG. 3, in the preferred embodiment, each of the legs 48 include at least one channel 74 disposed next adjacent the locking tab 52 and extending between the collar 46 and the receiving end 50 to reduce mechanical resistance of the legs 48 to a radial force applied by the locking barb 44, thus helping to allow the legs 48 to flex about the collar 46 during axial movement of the sensor housing 42.

As best shown in FIG. 4, the locking barb 44 also includes a second transition surface 76 sized complementary to the concave shape of the first transition surface 58 and which extends between the first shoulder 70 and the second tapered surface 72 for establishing sliding engagement along the corresponding transition surfaces 58, 72 during axial movement of the sensor housing 42. Accordingly, after the sensor housing 42 has advanced past the tapered surfaces 58 of the locking tabs 52, the second transition surface 76 of the locking barb 44 slides along the first transition surface 58 of the locking tab 52 until the first mechanical stops 54 and the first shoulder 70 are aligned. As best shown in FIG. 5, when the first shoulder 70 of the locking barb 44 is aligned with the first mechanical stops 54, the legs 48 snap back into place and the locking barb 44 is disposed in abutting relationship with the mechanical stop 54 to establish the interlocking relationship between the locking barb 44 and the legs 48. As previously mentioned, this type of snap fit design is to be considered non-serviceable once interlocked.

The snap fit design can also include an additional locking barb. In this design, as best shown in FIG. 4, a secondary gripping barb 78 extends radially outwardly from the male portion 66 between the locking barb 44 and the distal end 68. Similar to the locking barb 44, the secondary gripping barb 78 is disposed circumferentially about the male portion 66 to define a second shoulder 79. Correspondingly, as best shown in FIG. 6, the auxiliary passageway 38 of the coupling housing 22 defines an annular groove 82 having a second mechanical stop 83 for receiving the secondary gripping barb 78. During operation, when the sensor housing 42 is disposed in the interlocked position, the secondary gripping barb 78 is aligned with and mates with the annular groove 82 such that the second shoulder 79 and second mechanical stop 83 interact to establish secondary interlocking relationship between the coupling housing 22 and the sensor housing 42. This design feature provides more retention between the housings 22, 42 in the interlocked position to prevent blow-out of the sensor housing 42 and essentially makes the design tamper proof. In addition, the secondary gripping barb 78 increases tension and frictional fit between the housings 22, 42 to prevent rotational movement of the sensor housing 42 about the auxiliary axis $A_2$ once the sensor housing 42 is disposed in the interlocked position. While the preferred embodiment illustrates the secondary gripping barb 78 disposed on the male portion 66 of the sensor housing 42, the arrangement could be reversed such that the secondary gripping barb 78 extends radially outwardly from the auxiliary passageway 38 and the annular groove 82 is disposed on the male portion 66 of the sensor housing 42 to establish the secondary interlocking relationship.

As best shown in FIG. 6, the male portion 66 of the sensor housing 42 defines a sensor housing passageway 84 extending between the receiving portion 64 and the distal end 68 for establishing fluid communication between the coupling housing 22 and the sensor housing 42 in the interlocked position. The sensor housing passageway 84 allows the chosen sensor to communicate with the fluid in the coupling and auxiliary passageways 28, 38 and detect the desired property or characteristic of the fluid. In the preferred embodiment, the male portion 66 is cylindrical to define a male portion diameter $D_m$ sized complementary to the auxiliary passageway diameter $D_a$ for disposing the male portion 66 in abutting relationship with the auxiliary passageway 38. The male portion 66 also defines an annular notch 86 and an o-ring 80 is disposed within the annular notch 86 for establishing sealed relationship between the sensor housing 42 and the coupling housing 22 when the male portion 66 and the auxiliary passageway 38 are disposed in abutting relationship. The annular notch 86 and o-ring 80 design is advantageous because it provides a robust leak-free joint between the sensor housing 42 and the coupling housing 22 that also facilitates an up-down assembly motion when coupling the sensor housing 22, 42 with the sensor quick connector 40.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims. In addition, the reference numerals in the claims are merely for convenience and are not to be read in any way as limiting.

What is claimed is:

1. A quick connector assembly for establishing fluid communication between a first fluid line and a second fluid line and a sensor, said assembly comprising:
   a coupling housing extending along a coupling axis between an inlet end and an outlet end;
   a fluid quick connector disposed about one of said ends;
   said coupling housing defining a coupling passageway extending along said coupling axis between said ends and an auxiliary passageway in fluid communication with said coupling passageway and extending along an auxiliary axis which intersects said coupling axis;
   said coupling housing including a sensor quick connector axially aligned with said auxiliary axis;
   a sensor housing insertable into said sensor quick connector along said auxiliary axis and including at least one locking barb to establish an interlocked position of said coupling housing and said sensor housing;
   said sensor quick connector including at least one leg and said locking barb extending radially outwardly for flexing said at least one leg radially outwardly relative to said auxiliary axis during axial movement of said sensor housing along said auxiliary axis to establish said interlocked position of said coupling housing and said sensor housing;
   said leg including a mechanical stop and said locking barb including a first shoulder for engaging said mechanical stop in said interlocked position to prevent axial movement of said sensor housing;
   said sensor housing including a male portion extending downwardly from said locking barb to a distal end disposed within said auxiliary passageway in said interlocked position; and
   said at least one locking barb including a secondary gripping barb extending radially outwardly from said male portion between said locking barb and said distal end and said coupling housing defining a groove for receiving said secondary gripping barb in said interlocked position of said housings to establish secondary interlocking relationship between said housings and prevent rotational movement of said sensor housing about said auxiliary axis.

2. A connector assembly as set forth in claim 1 wherein said sensor housing includes a receiving portion for coupling a sensor with said sensor housing and said male portion defines a sensor housing passageway extending from said receiving portion to said distal end for establishing communication between the sensor and said coupling housing to allow the sensor to monitor a characteristic of fluid in said coupling passageway and said auxiliary passageway.

3. A connector assembly as set forth in claim 1 wherein said auxiliary passageway has an auxiliary passageway diameter and said male portion is cylindrical to define a male portion diameter complementary to said auxiliary passageway diameter for establishing abutting relationship between said male portion and said auxiliary passageway.

4. A connector assembly as set forth in claim 3 wherein said male portion defines an annular notch and an o-ring is disposed within said annular notch for establishing sealed relationship between said sensor housing and said coupling housing in said interlocked position.

5. A connector assembly as set forth in claim 1 wherein said secondary gripping barb extends circumferentially about said male portion to define a second shoulder and said groove is annularly disposed about said auxiliary passageway to define a second mechanical stop wherein said second shoulder and said second mechanical stop interact to establish said secondary interlocking relationship and further prevent axial movement of said sensor housing.

6. A connector assembly as set forth in claim 1 wherein said auxiliary axis is disposed transverse to said coupling axis.

7. A connector assembly for establishing fluid communication between a first fluid line and a second fluid line and a sensor, said assembly comprising:
   a coupling housing extending along a coupling axis between an inlet end and an outlet end;
   a fluid quick connector disposed about one of said ends;
   said coupling housing defining a coupling passageway extending along said coupling axis between said ends and an auxiliary passageway in fluid communication with said coupling passageway and extending along an auxiliary axis which intersects said coupling axis;
   said coupling housing including a sensor quick connector axially aligned with said auxiliary axis;
   a sensor housing insertable into said sensor quick connector along said auxiliary axis and including at least one locking barb to establish an interlocked position of said coupling housing and said sensor housing;
   said sensor quick connector including at least one leg and said locking barb extending radially outwardly for flexing said at least one leg radially outwardly relative to said auxiliary axis during axial movement of said sensor housing along said auxiliary axis to establish said interlocked position of said coupling housing and said sensor housing;

said coupling housing including a collar extending circumferentially about said auxiliary axis to further define said auxiliary passageway and said at least one leg extending from said collar to a receiving end for allowing said at least one leg to flex about said collar during said axial movement of said sensor housing; and said at least one leg having a first tapered surface being tapered towards said receiving end and said locking barb having a second tapered surface sized complementary to said first tapered surface and being tapered from said first shoulder towards said distal end for establishing sliding engagement along said tapered surfaces during axial movement of said sensor housing to flex said at least one leg radially outwardly about said auxiliary axis.

8. A connector assembly as set forth in claim 7 wherein said at least one leg having a first transition surface extending between said first tapered surface and said mechanical stop and said locking barb having a second transition surface sized complementary to said first transition surface and extending between said first shoulder and said second tapered surface for establishing sliding engagement along said tapered surfaces during axial movement of said sensor housing to align said mechanical stop and said first shoulder and allow said at least one leg to snap radially inwardly and establish said interlocked position of said sensor housing and said coupling housing.

9. A connector assembly as set forth in claim 8 wherein said locking barb extends circumferentially about said male portion to define said first shoulder.

10. A connector assembly as set forth in claim 9 wherein at least one said leg is semi-cylindrical to define a convex surface relative to the auxiliary axis and disposed opposite said first transition surface and wherein said first transition surface is concave relative to the auxiliary axis to correspond with said locking barb.

11. A connector assembly as set forth in claim 10 wherein said at least one leg defines a window extending therethrough between said surfaces to define said first mechanical stop.

12. A connector assembly as set forth in claim 11 wherein said at least one leg defines at least one channel disposed next adjacent said surfaces and extending between said collar and said receiving end for reducing mechanical resistance of said at least one leg to said flexing.

* * * * *